United States Patent [19]

Huntzinger

[11] Patent Number: 4,660,893
[45] Date of Patent: Apr. 28, 1987

[54] SPOKED WHEEL COVER

[76] Inventor: Mark H. Huntzinger, 3598 Mira Pacific Dr., Oceanside, Calif. 92056

[21] Appl. No.: 771,841

[22] Filed: Sep. 3, 1985

[51] Int. Cl.⁴ .............................................. B60B 7/06
[52] U.S. Cl. ............................ 301/37 SA; 301/37 P
[58] Field of Search ............... 301/37 R, 37 SA, 37 P, 301/108 S, 108 P

[56] References Cited

U.S. PATENT DOCUMENTS

| 1,351,261 | 8/1920 | Miller | 301/108 S |
| 1,406,945 | 2/1922 | Dunlap et al. | 301/37 S |
| 3,004,798 | 10/1961 | Tylle | 301/37 P |
| 4,201,448 | 5/1980 | Kagayama | 301/37 SA X |
| 4,418,962 | 12/1983 | Schaffer | 301/37 P |

FOREIGN PATENT DOCUMENTS

| 626932 | 9/1927 | France | 301/37 SA |
| 255631 | 10/1927 | Italy | 301/37 SA |
| 2046493 | 11/1980 | United Kingdom | 301/37 SA |

Primary Examiner—David A. Scherbel
Attorney, Agent, or Firm—Brown, Martin, Haller & Meador

[57] ABSTRACT

The device for attaching a flexible wheel cover to a spoked wheel to decrease the drag generally comprises a body including means for attaching the body to a wheel spoke and a fastening portion for attaching a flexible wheel cover to the body. A slot in the body receives a spoke. The cap of a compression fastener fastened to body immediately adjacent the spoke bears on the portion of the spoke in the slot to fixedly attach the device to the spoke and so that rotation of the compression fastener moves the device along the spoke. A cover for fastening to the attaching/tensioner device comprises a conical sheet of flexible material, such as DuPont Mylar.

15 Claims, 7 Drawing Figures

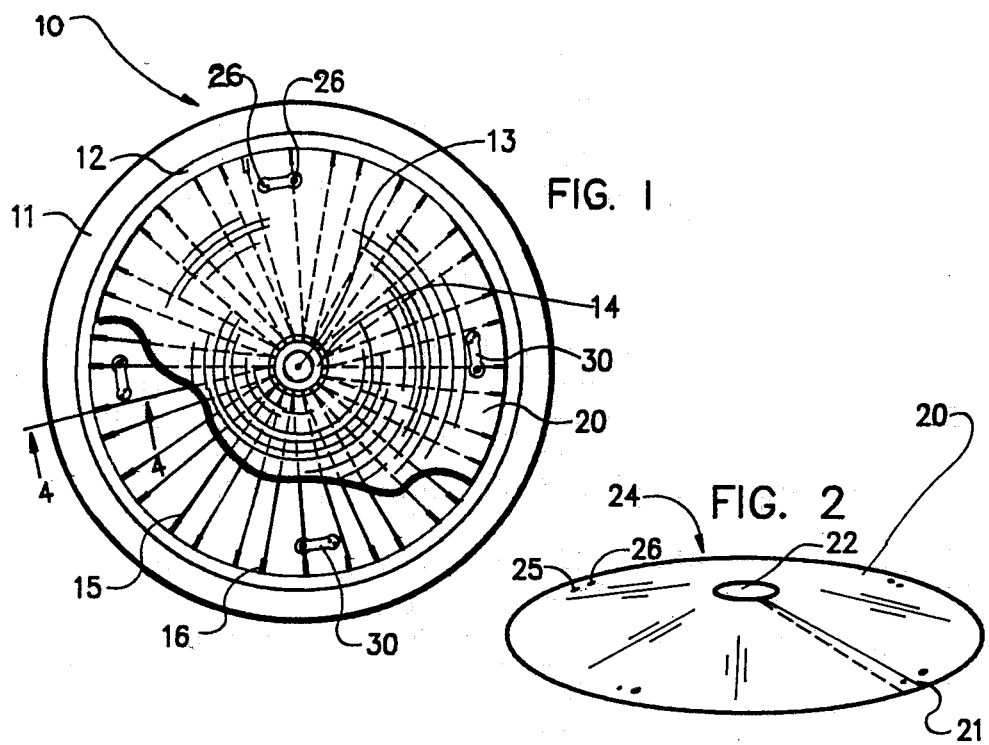
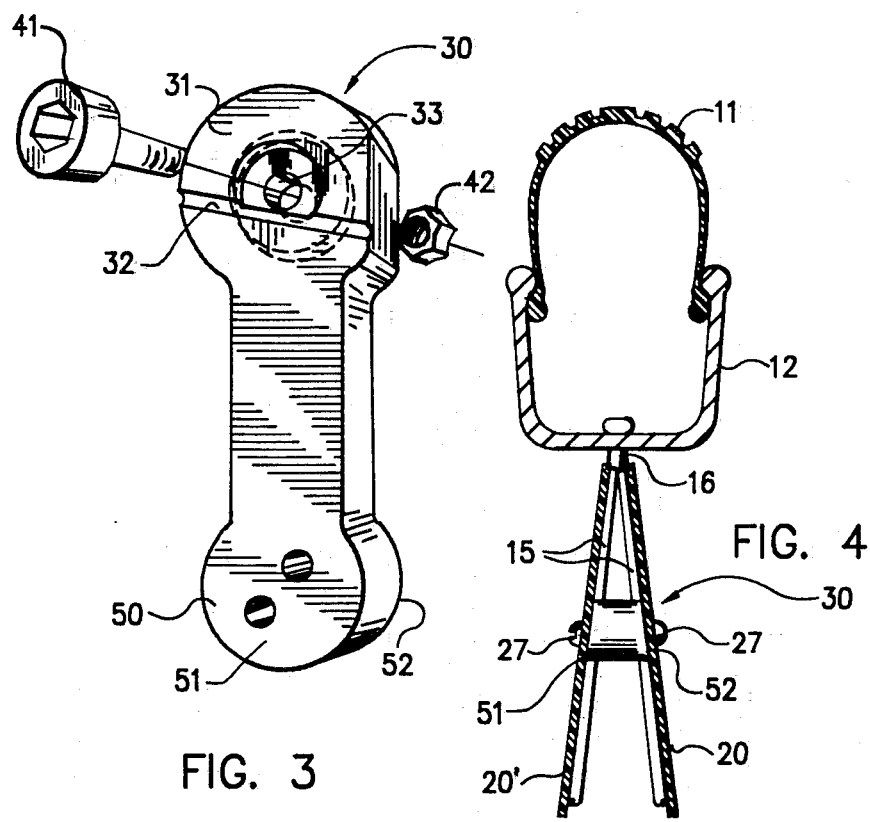

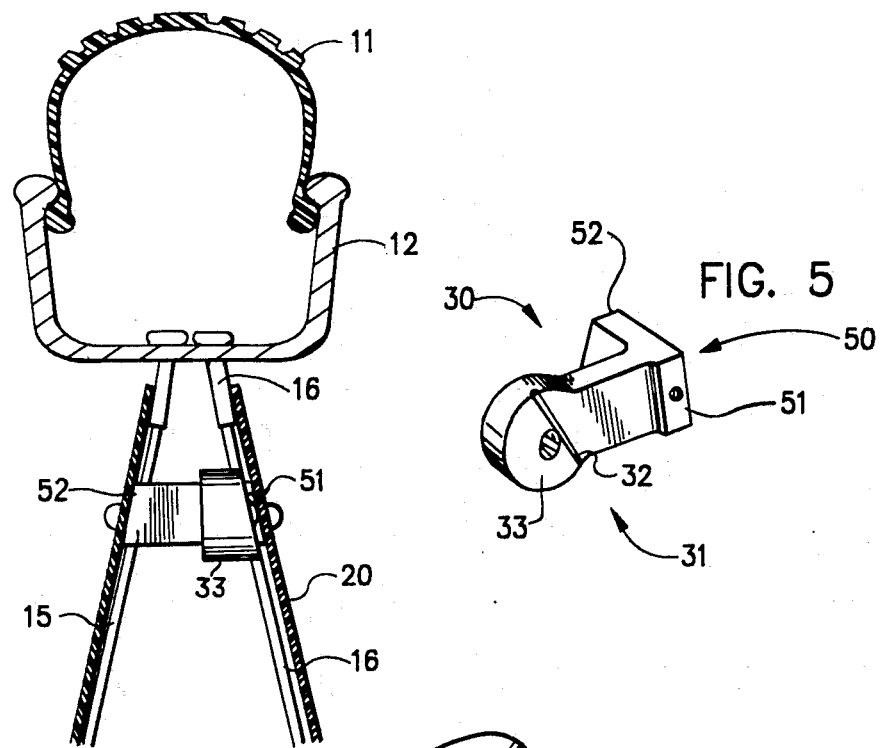
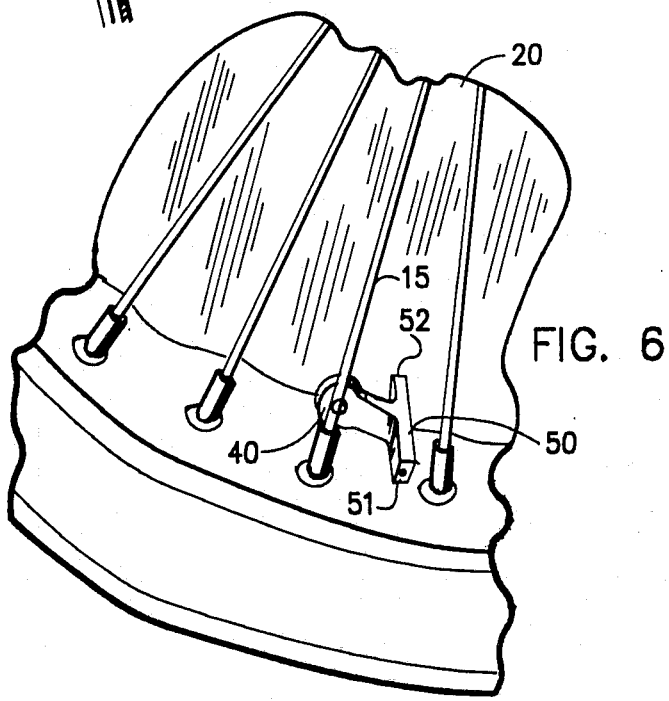

4,660,893

SPOKED WHEEL COVER

BACKGROUND OF THE INVENTION

1. Field of the Invention

This invention relates in general to a cover for a spoked wheel and more particularly to a method and device of attaching and tensioning a flexible cover on a spoked wheel.

2. Background of the Invention

Spoked wheels are extrememly lightweight for their strength. This feature is very advantageous on bicycles, particularly touring or racing bicycles, where it is desirable to obtain as light a weight as possible to obtain low road friction and to decrease inertia. A spoked bicycle wheel may be as light as two pounds or less.

Spokes, however, cause considerable aerodynamic drag which must be overcome by the motive force, such as a motor or pedeler. The amount of drag increases approximately with the square of the speed, so drag is of particular importance on high-speed racing bikes, but it is present to some degree at all speeds and results in wasted energy.

One method to overcome spoke drag is elimination of the spokes and substitution of solid rim. However, these solid rims have several drawbacks. Even though they may be constructed of materials using the latest technology, solid rims are heavier then spoked wheels. Therefore, they increase the road friction, and the high inertia contributes to slow start-up speeds and more difficult stopping. These wheels are currently extremely expensive and may cost as high as $1,000.00 per wheel. The solid wheels weigh approximately 4 pounds.

Therefore, it is desirable to have a lightweight cover for a spoked wheel.

There are several problems associated with devising a spoked wheel cover. A major problem is that rims of spoked wheels flex in the axial direction. Spoked bicycle rims typically flex about ½ inch in each direction. Therefore, a wheel cover must flex or otherwise be mounted to account for this flexion. If a flexible cover is used to satisfy the above criterion, then it is usually difficult to attach and be secured to the wheel. Additionally, if thin, lightweight, flexible material is used to cover the wheel, besides having to attach it, it is necessary to tension it to provide a smooth, low-drag configuration.

Therefore, it is desirable to have a flexible, lightweight wheel cover for a spoked wheel.

It is desirable that such a wheel cover be easily attachable to conventional spoked wheels, without modification to the wheel.

It is further desirable that such a wheel cover be attractive in appearance, be easily and quickly installed, and be of low cost.

SUMMARY OF THE INVENTION

This invention is a device and a method for attaching a cover to a spoked wheel. According to the invention, the device generally comprises a body, attaching means on the body for attaching the body to a wheel spoke, and a fastening portion for attaching a flexible wheel cover to the body. A slot in the body portion of the device receives a spoke. A compression fastener in the body adjacent to the slot and bearing on the spoke secures the device to the spoke at a particular location. Rotation of the cap of the compression fastener bearing on the spoke causes the device to move longitudinally along the spoke, thus tensioning an attached cover.

The cover for a spoked wheel comprises a sheet of flexible material for at least partially covering the spokes of a spoked wheel. In the exemplary embodiment, the cover is generally conical in configuration with a hole in the center for placing over a wheel hub.

The method of covering a spoked wheel with a flexible material includes making a cone out of flat flexible sheet material, but cutting a circular disk of outside diameter of approximately that of the rim of spoked wheel and cutting a radial slit in the circular disk, overlapping the sheet along the radial cut to form a cone and securing the overlapping portions of the cone, cutting a hole at the apex of the cone for fitting the hub of a spoked wheel, attaching a plurality of securing devices to a corresponding plurality of spokes, attaching the cone of flexible material to the securing devices, and radially tensioning the sheet by moving the securing devices longitudinally along a spoke.

Other features and many attendant advantages of the invention will become more apparent upon a reading of the following detailed description together with the drawings in which like reference numerals refer to like parts throughout.

BRIEF DESCRIPTION OF THE DRAWINGS

FIG. 1 is a side elevation view of a typical spoked wheel with the cover partially cut away.

FIG. 2 is a perspective view of an embodiment of the cover.

FIG. 3 is an enlarged perspective view of the attaching and adjusting device.

FIG. 4 is an enlarged sectional view of the wheel and fastener taken along the line 4—4 of FIG. 1.

FIG. 5 is a perspective alternative embodiment of the fastener/tensioner of FIG. 3.

FIG. 6 is a perspective view of a portion of the wheel showing the fastener of FIG. 5 as mounted in use.

FIG. 7 is a sectional view similar to FIG. 5 showing the embodiment of FIG. 5.

DETAILED DESCRIPTION OF THE INVENTION

With reference now to the drawings, and more particularly to FIG. 1 thereof, a wheel, shown generally as 10, comprises a tire 11, rim 12, axle 13 and hub 14. Spokes, shown generally as 15, extend from hubs 14 on each of the axles to the rim 12 to support the rim and tire. Typically, the outer end of a spoke is threaded and is secured to the rim by an adjustment fastener 16 which also controls the spoke tension.

As seen in FIG. 1, the invention generally comprises a cover 20 comprised of a sheet of flexible material which is attached to fastener/tensioner devices 30, each of which is attached to a spoke.

FIG. 2 illustrates the preferred embodiment of the cover 20 of flexible material. Cover 20 is a sheet of flexible material such as polyester film. Flat DuPont Mylar of approximately 0.010 inches in thickness has been found to be particularly suitable. The conical cover illustated in FIG. 2 is made from a flat sheet of polyester film by cutting a circle of outside diameter approximately equal to the inside diameter of the rim 12. A radial slit 21 is cut in the circular sheet of film and an axle hole 22 is cut in the center of the sheet. The edges of radial slit 21 are overlapped to form a cone which conforms to the outer surface of the spokes passing from the axle to the rim. Preferably, two quite similar covers 20 are mounted on the wheel 10, one on each side, thereby covering the spokes 15.

FIG. 3 illustrates an exemplary embodiment of the fastener/tensioner device for mounting on a spoke. The device includes a body portion 31 which contains a slot 32 for receiving a spoke. The depth of slot 32 is preferably greater than or equal to the diameter of the spoke so that the spoke lies at or below the plane of body portion 31. A bore 33 through body portion 31 adjacent the slot 32 receives a compression fastener 41, such as screw or bolt 41 and nut 42. The head of bolt 41 overlaps spoke 15 in the slot and bears against the spoke. Bore 33 may be counterbored to allow the head of fastener 41 to bear against the spoke in slot 32. Thus, when nut 42 is tightened on bolt 41, fastener/tensioner device 30 is secured to the spoke. Bolt 41 and nut 42 cooperate in the manner that to move relative to one another, one must be turned while the other is held.

Once the fastener/tensioning device 30 is secured to spoke 15 by the compression fastener 41, rotating the cap of the compression fastener, i.e. either the head of screw or bolt 41 or the nut 42, which bears against the spoke while allowing the other cap to freely turn with the rotation causes the fastener/tensioning device to move longitudinally along the spoke because of the frictional engagement between the backside of the cap and spoke. Preferably the compression fastener 41 head has a slot so that it may be turned with a screwdriver or other simple tool.

Body portion 31 includes a fastening portion 52 to which cover 20 is fastened. In the preferred embodiment of FIG. 3, the fastening portion 50 contains two cover fastening holes; one for fastening a cover on the near side of the wheel and one for fastening a cover on the far side of the wheel. The width of fastening portion 50 between front face 51 and rear face 52 tapers as seen in FIG. 4 to coincide with the converging spoke planes on the front and rear sides of the wheel. In this manner both front and rear covers are screwed or bolted to a single fastener/tensioning device 30. The lateral separation distance between fastening portion 50 and the compression fastener 40 creates a binding effect on the spoke in the slot once tension is established and also aids in securely retaining the fastener/tensioner device 30 in a fixed location along the spoke. Use of only one fastener/tensioner device 30 to secure both covers on both sides of the wheel aids in weight reduction.

FIG. 4 is an end view of the fastener/tensioner device of FIG. 3 in use holding covers on a spoked wheel. Spokes 15 converge from the hub (not shown) to rim 12 containing tire 11. Compression fastener 40 comprised of bolt 41 and nut 42 hold the device to a spoke. Front and rear wheel covers 20 are secured to the device by wheel cover fastening screws 27. The rear face 52 of fastening portion 50 lies in the plane of the rear spokes to accommodate rear wheel cover 20.

FIGS. 5, 6 and 7 illustrate an alternate embodiment of the fastener/tensioner device 30 of the present invention for use on spoked wheels having wide rims so that the front and rear spoke planes are at a greater distance apart where they meet the rim then is the case in standard high-pressure tire wheels. This embodiment differs from the embodiment of FIG. 3 in that the fastening portion 50 is designed so that front face 51 and rear face 52 are displaced a greater distance to lie in the respective outside planes of the front and rear spokes respectively.

To attach the covers, a plurality of fastener/tensioner devices 30 are attached to spokes near the rim. Usually four fastener/tensioner devices are sufficient. The devices are attached with symmetrical spacing for dynamic balance. A small outward space on the spoke should be left to allow for outward adjustment and tensioning of the covers. Cover holes 24, such as slot tensioning hole 25 and fastening hole 26, may be put in the cover by any suitable means and their location may be predetermined or may be located by marking from the spoked-attached fastener/tensioner devices 30. The covers 20 are attached by any suitable means such as screws to the front and rear faces 51, 52 of fastening portion 50, and then the compression fastener 40 is turned, moving the fastener/tensioner device 30 longitudianally radially outward along its spoke thereby tensioning the cover to form a smoother surface.

Covering a wheel in the manner of the present invention adds only about 7 ounces to the weight of the wheel.

For attractiveness the wheel covers may be colored or be mirror-like. Such covers may also be used for writing and advertisements. The covers may be reflective or contain reflective patterns to enhance nighttime safety.

From the foregoing description, it is seen that the present invention provides an extremely simple, efficient, and reliable manner of covering a spoked wheel.

Having described the preferred embodiments of the present invention, many alterations and modifications which are within the inventive concepts disclosed herein will likely occur to those skilled in the art. For example, the fastener/tensioner device may have a different configuration and may retain and tension only one cover. Also, it is possible to use a similar means of fastening the fastener/tensioner device to a spoke which likewise allow the device to move longitudinally to act as a tensioner. Also, although the invention is described primarily in terms of covers for spoked bicycle wheels, this invention is not so restricted and may be applied to any spoked wheel.

Accordingly as various changes may be made in the form, construction, and arrangement of the parts herein, without departing from the spirit and scope of the invention and without sacrificing any of its advantages, it is to be understood that all matter herein is to be interpreted as illustrative and not in any limiting sense.

I claim:

1. A device for attaching a flexible wheel cover to a spoked wheel comprising:
   a one piece body;
   a slot in the body for receiving a wheel spoke;
   attachment means on said body for engaging the spoke in said slot to attach said body to the wheel spoke and for moving said body longitudinally along said spoke; and a fastening portion for attaching a flexible wheel cover to said body.

2. The device of claim 1 wherein said attachment means further comprises:
   adjustment means rotatably connected to said body and frictionally engaging said spoke for moving and adjusting said body longitudinally along said spoke to which said body is attached while said body is attached to said spoke.

3. The device of claim 1 comprising:
   adjustment means connected to said body for moving said body longitudinally along a spoke to which said body is attached; and wherein said adjustment means includes frictional engaging means for engaging the spoke; and said frictional engaging means is the cap of a compression fastener bearing on the spoke in said slot so that rotation of the compression fastener moves said body along the spoke.

4. The device of claim 1 wherein said one-piece body comprises an elongated central portion and two ends one comprising said fastening portion and the other comprising an attachment portion having said slot.

5. A cover for a spoked wheel comprising:
a sheet of flexible material for at least partially covering the spokes of a spoke wheel; and
attaching means for attaching said sheet to a plurality of spokes comprising:
radial adjustment means for engaging said spokes and moving said attaching means longitudinally along a spoke while engaged therewith for radially tensioning said cover.

6. The cover of claim 5 wherein said attaching means comprises:
a one piece body;
a slot in the body for receiving a wheel spoke;
engagement means on said body for engaging the spoke in said slot and attaching said body to the wheel spoke; and
a fastening portion for attaching a flexible wheel cover to said body.

7. The cover of claim 6 wherein said radial adjustment means includes:
frictional engaging means for engaging the spoke.

8. The cover of claim 7 wherein:
said frictional engaging means is the cap of a compression fastener bearing on the spoke in said slot so that the rotation of the compression fastener moves said body along the spoke.

9. The cover of claim 5 wherein said one-piece body comprises an elongated central portion and two ends one comprising said fastening portion and the other comprising an attachment portion having said slot.

10. The cover of claim 5 wherein said sheet of thin flexible material weighs less than 6 ounces.

11. The cover of claim 5 wherein said sheet of thin flexible material weighs less than 4 ounces.

12. The cover of claim 5 wherein said cover comprises a thin flexible layer of mylar plastic.

13. A method of covering a spoked wheel with a thin flexible sheet of material comprising the steps of:
securing a plurality of attachment means to a corresponding plurality of spokes, said attachment means comprising a sloted body; engagement means on the body for engaging the spoke in the slot to attach the body to the spoke; adjustment means rotatably connected to the body and frictionally engaging the spoke;
attaching a sheet of flexible material to said attachment means; and
radially tensioning said sheet by moving said attachment and adjusting means longitudinally along a spoke by rotating the adjustment means while in contact with said spoke.

14. A device for attaching a flexible wheel cover to a spoked wheel comprising:
a one piece body having a slot for receiving a wheel spoke and a fastening portion for attaching a flexible wheel cover to said body;
securing means means for securing the spoke in said slot and attaching said body to the spoke;
adjustment means connected to said body for moving said body longitudinally along a spoke to which said body is attached wherein said adjustment means comprises frictional engaging means for engaging the spoke; and
said frictional engaging means is the cap of a compression fastener bearing on the spoke in said slot so that rotation of the compression fastener moves said body along the spoke.

15. A cover for a spoked wheel comprising:
a sheet of flexible material for at least partially covering the spokes of a spoke wheel;
attaching means for attaching said sheet to a plurality of spokes comprising:
a body having a slot in the body for receiving a wheel spoke;
engagement means on said body for attaching said body to the wheel spoke; and
a fastening portion for attaching a flexible wheel cover to said body;
radial adjustment means for engaging said spoke and moving said attaching means longitudinally along a spoke while engaged therewith for radially tensioning said cover, said radial adjustment means comprising:
frictional engaging means for engaging the spoke, comprising the cap of a compression fastener bearing on the spoke in said slot so that the rotation of the compression fastener moves said body along said spoke.

* * * * *